US010955806B2

(12) United States Patent
Wernersbach et al.

(10) Patent No.: US 10,955,806 B2
(45) Date of Patent: Mar. 23, 2021

(54) SYSTEM AND METHOD FOR MONITORING AND ANALYZING INDUSTRIAL OPERATIONS

(71) Applicants: Philip Wernersbach, Cincinnati, OH (US); Glen C. Wernersbach, Cincinnati, OH (US)

(72) Inventors: Philip Wernersbach, Cincinnati, OH (US); Glen C. Wernersbach, Cincinnati, OH (US)

( * ) Notice: Subject to any disclaimer, the term of this patent is extended or adjusted under 35 U.S.C. 154(b) by 0 days.

(21) Appl. No.: 16/382,476

(22) Filed: Apr. 12, 2019

(65) Prior Publication Data
US 2019/0235464 A1    Aug. 1, 2019

Related U.S. Application Data

(62) Division of application No. 15/041,183, filed on Feb. 11, 2016, now Pat. No. 10,310,474.

(51) Int. Cl.
G05B 11/01        (2006.01)
G05B 19/042       (2006.01)

(52) U.S. Cl.
CPC ............... *G05B 19/0428* (2013.01); *G05B 2219/14006* (2013.01); *G05B 2219/31208* (2013.01); *Y02P 90/02* (2015.11)

(58) Field of Classification Search
CPC ...... G05B 19/0428; G05B 2219/14006; G05B 2219/31208; Y02P 90/18
See application file for complete search history.

(56) References Cited

U.S. PATENT DOCUMENTS

| | | |
|---|---|---|
| 4,570,217 A | 2/1986 | Allen |
| 5,321,619 A | 6/1994 | Matsuda |
| 5,384,697 A | 1/1995 | Pascucci |
| 5,710,723 A | 1/1998 | Hoth |
| 6,738,748 B2 | 5/2004 | Wetzer |
| 6,795,798 B2 | 9/2004 | Eryurek |
| 7,218,974 B2 | 5/2007 | Rumi et al. |
| 7,467,018 B1 | 12/2008 | Callaghan |
| 7,533,798 B2 * | 5/2009 | Jones ............ B25J 19/06 235/375 |
| 7,562,216 B2 | 7/2009 | Borthakur et al. |
| 7,565,351 B1 | 7/2009 | Callaghan |
| 7,676,285 B2 | 3/2010 | Hoyte |
| 7,734,590 B2 | 6/2010 | Chand et al. |
| 7,882,394 B2 | 2/2011 | Hosek |
| 7,983,769 B2 | 7/2011 | Chaffee et al. |
| 8,019,796 B1 | 9/2011 | Chand et al. |

(Continued)

OTHER PUBLICATIONS

International Search Report and Written Opinion, International Application No. PCT/US17/17131, dated Apr. 27, 2017.

(Continued)

*Primary Examiner* — Robert G Bachner
(74) *Attorney, Agent, or Firm* — Mark F. Smith; Smith Brandenburg Ltd

(57) ABSTRACT

An industrial system and method for monitoring and analyzing industrial operations such that data is obtained from one or more sensors of one or more industrial components and transmitted to a master controller as a data stream through a communication network, the transmitted data is captured, copied, and stored for analysis without interfering with the data stream.

12 Claims, 18 Drawing Sheets

(56) References Cited

U.S. PATENT DOCUMENTS

| | | |
|---|---|---|
| 8,244,380 B2 | 8/2012 | Grgic et al. |
| 8,484,401 B2 | 7/2013 | Bezdicek et al. |
| 8,806,099 B2 | 8/2014 | Hall |
| 8,984,533 B2 | 3/2015 | Bezdicek et al. |
| 9,094,304 B2 | 7/2015 | Shepherd et al. |
| 9,100,289 B2 | 8/2015 | Mehta et al. |
| 9,116,932 B2 | 8/2015 | Zhou et al. |
| 9,124,909 B1 | 9/2015 | Galt et al. |
| 9,579,788 B2 | 2/2017 | Rosenberg |
| 2001/0013087 A1* | 8/2001 | Ronstrom ............. G06F 12/122 711/133 |
| 2004/0054776 A1* | 3/2004 | Klotz ...................... H04L 41/06 709/224 |
| 2007/0299706 A1 | 12/2007 | Galt et al. |
| 2014/0336984 A1 | 11/2014 | Starr |
| 2015/0281356 A1 | 10/2015 | Maturana et al. |
| 2016/0070652 A1 | 10/2016 | Sundararaman et al. |

OTHER PUBLICATIONS

U.S. Office Action dated Sep. 19, 2018, U.S. Appl. No. 15/041,183, filed Feb. 11, 2016.

U.S. Office Action dated Dec. 27, 2017, U.S. Appl. No. 15/041,183, filed Feb. 11, 2016.

\* cited by examiner

SYSTEM AND METHOD FOR MONITORING AND ANALYZING INDUSTRIAL OPERATIONS

RELATED PATENT APPLICATIONS

The present application is a divisional patent application of U.S. patent application Ser. No. 15/041,183, filed Feb. 11, 2016 and claims benefit to and incorporates in its entirety by reference the subject matter contained therein.

BACKGROUND OF THE INVENTION

The present invention is directed to monitoring and analyzing industrial operations and more specifically, to a system and method for monitoring and analyzing industrial operations such that data is captured, copied, and stored for analysis.

In the past machines were self-contained mechanical devices generally having multiple parts that were controlled using various mechanical control systems. As machines developed, electronic control systems have replaced or supplemented the mechanical control systems and now many control systems operate apart from the machine itself utilizing communication systems that operate through one or more communication networks to transfer control commands from a controller, such as a programmable logic control systems (PLC), to the machine. Communication systems typically operate to transfer information, such as data and data packages, for review and storage in various device databases and often include data derived from sensors, controllers and other sources that operate together to monitor the operation of such machines.

As computational capabilities of large computer systems have become faster and cheaper, there is a benefit to being able to analyze industrial systems containing one or more machines or components on a macro scale. While a failure in most industrial operations are not life threatening, a component or system stoppage, such as for example on a packaging line, can result in thousands of dollars of lost production. Accordingly, for industrial systems, it is desirable to do predictive analysis on a single industrial system to predict when similar systems or system components need to receive maintenance or servicing prior to expected failure. Many industrial systems, which often incorporate one or more components operating within a network, would also benefit by having predictive analytics incorporated into to the systems. However, many industrial systems operating in a network have been in continuous operation for many years and operators are hesitant or unwilling to change the PLC programming controlling such systems. Therefore, it would be desirable to be able to monitor and analyze industrial operations comprising one or more industrial components operating within a network without having to reprogram or modify existing control programs.

Communication between the various industrial components within a network also now typically operate at a sub-millisecond level and millions of characters of data per second are exchanged without the need of human interaction. For network developers, it would be desirable to monitor such communication and data being transferred and exchanged between the industrial components operating within a communication network. Various systems have been developed for providing analytics to such industrial networks. One method that has been utilized is to monitor event-based data from human machine interface (HMI) or open platform communications (OPC) tags. When the state of the tag changes, a monitor would reflect that an error occurred. By placing the event-based data into a historian program and analyzing it over time, it is possible to determine what errors were occurring most often. This event and status based system is considered low risk because it only requires reprogramming of the HMI screens and not the reprogramming of the PLC. Unfortunately, such event-based monitoring and predictive systems are limited by using data after an error has occurred and not data generated just prior to and during an error. Other monitoring systems, for example the free and open-source packet analyzer known as WIRESHARK, have been developed for network troubleshooting, analysis, software and communications protocol development, and education. In operation, such systems operate to monitor network communication and to allow users to pick out specific types of data (data packets) and display all the communication traffic addressed to one of the interface's configured addresses. However, the systems are not always sufficient to see all network traffic. Further, the systems do not operate to receive data and place the data in a query-able database necessary for performing detailed analysis, such as a predictive analysis.

Another problem with systems that monitor network communications and obtain data being transferred in a data stream is that such systems operate to interact with the data stream to collect and store data. This interaction often interrupts, disturbs or interferes with the data stream and with data being transmitted to and from the various industrial components and to and from the master controller. Further, such systems do not operate to convert data, such as Common Industrial Protocol data, being transmitted through a communications network into a query-able format and stored in a query-able database. Often such systems operate using an "update-in-place" methodology in which a performer consumes the data as it detects the data. The performer captures data and updates the data stored in the database by replacing (overriding) the existing stored data. Accordingly, since the data stored in the database is constantly being replaced with new current data, such systems are unable to perform analysis using past or historical data in order to make a predictive analysis.

Until now, in order to monitor industrial systems and obtain and store data for predictive analysis, the PLC programming controlling the industrial system would require modifying or creating and/or installing new programming. This would often require upgrading the PLC hardware as well as installing new programming. The upgraded PLC hardware and/or programming adds new and potentially instable variables that can result in significant loss of time and increase in costs due to system failure or interruption. Thus, for many operations the potential lost time and increase in costs makes such changes in the PLC programming and/or PLC hardware unacceptable.

SUMMARY OF THE INVENTION

The subject invention is a new and novel system and method for monitoring and analyzing industrial operations such that data is obtained from one or more sensors of one or more industrial components and transmitted to a master controller. The transmitted data is copied and stored for analysis without interfering with the transmission of the data to the master controller.

A preferred embodiment of the invention is a system for monitoring and analyzing industrial operations comprises at least one industrial component having at least one sensor that operate to obtain data on the operation of the at least one industrial component, a communication network that transmits the data to a master controller, a performer that copies the data being transmitted by the communication network without interfering with the data being transmitted to the master controller, and a databank for storing the data copied by the performer.

Another preferred embodiment of the invention is a system for monitoring and analyzing industrial operations comprising at least one industrial component having at least one sensor that operates to obtain data from the at least one industrial component, at least one component control system that operates to receive the data and to transmit the data in the form of a data stream through a communication network to a master controller, a performer in communication with the communication network and operates to copy the data from the data stream without impeding the data stream, and wherein the performer further operates to convert the copied data into a query-able format and stores the converted data in a query-able database.

In a preferred embodiment of the invention, the system further comprises an analyzer that operates to select all or portions of the copied and converted data stored in the query-able database and makes a comparison of the data to reference data and using the comparison determines if the one or more industrial components are properly performing their desired functions.

In another preferred embodiment of the invention the system further comprises an analyzer that operates to select all or portions of the data stored in the query-able database and makes a comparison of the data to reference data and using the comparison determines if specific elements comprising the one or more industrial components are operating within operating specifications.

In another preferred embodiment of the invention the analyzer operates to make comparisons and/or analyze the stored data in the query-able database for a specific industrial component prior to the specific industrial component having an error or a malfunction.

In another preferred embodiment of the invention the analyzer operates to predict the likelihood or probability of a specific industrial component having an error or a malfunction within a predefined time segment by making a comparison of data for the industrial component prior to sustaining an error or malfunction with data stored in the query-able database for other similar industrial components within a predefined time frame prior to the similar industrial components having an error or a malfunction and using the comparison the analyzer operates, such as by use of fuzzy logic, to make predictions and/or one or more recommendations with regard to the specific industrial component.

In another preferred embodiment of the invention the data being transmitted through the communication network is in the form of data packages, whereby metadata is appended to each data packet and whereby the data packets are compressed and bunched together into optimized sized bytes and stored in the query-able database.

Another preferred embodiment of the invention is a system for monitoring and analyzing industrial operations comprising one or more industrial components each having a component control system and one or more sensors that operate to obtain data related to the operation of the one or more industrial components, wherein each component control system is in communication with a communication network for transferring the data in the form of data packets to a master controller, wherein the data packets are contained in one or more layers of a protocol architecture and wherein a performer operates to unwrap and copy the data contained within the data packages without impeding the transference of the data packets to the master controller, and further operates to convert the data by a structured query language and stores the data in a query-able database.

In a preferred embodiment of the invention the performer operates to parcel out the data contained in each data package to form one or more sets of data each set having a field, and wherein the performer further operates to convert each set of data by a structured query language by constructing an insert query into each field in each set of data.

In another preferred embodiment of the invention the system further database, aggregate the data, print out requested reports regarding the data, run a mathematical analysis (such as a statistical or predictive analysis) of the data, and uses the mathematical analysis to make predictions and/or recommendations.

Another preferred embodiment of the invention is a system for monitoring and analyzing industrial operations comprises one or more industrial components each having one or more sensors that operate to obtain data related to the operation of the one or more industrial components, whereby the data is transferred to a master controller, an analyzer that receives the data and operates to select all or portions of the data and makes a comparison of the data to reference data and determines using the comparison if the one or more industrial components are not properly performing within operating specifications and/or if one or more industrial components are predicted to fail within a predefined time segment, wherein the analyzer further operates to transmit a warning if the one or more industrial components are not performing within operating specifications and/or if the one or more industrial components are predicted to fail within a predefined time segment.

In a preferred embodiment of the invention, the analyzer further operates to make a recommendation with regard to the one or more industrial components based on the comparison.

Various other objects, advantages, and embodiments of the invention will be apparent from the following description, the accompanying drawings, and the appended claims.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
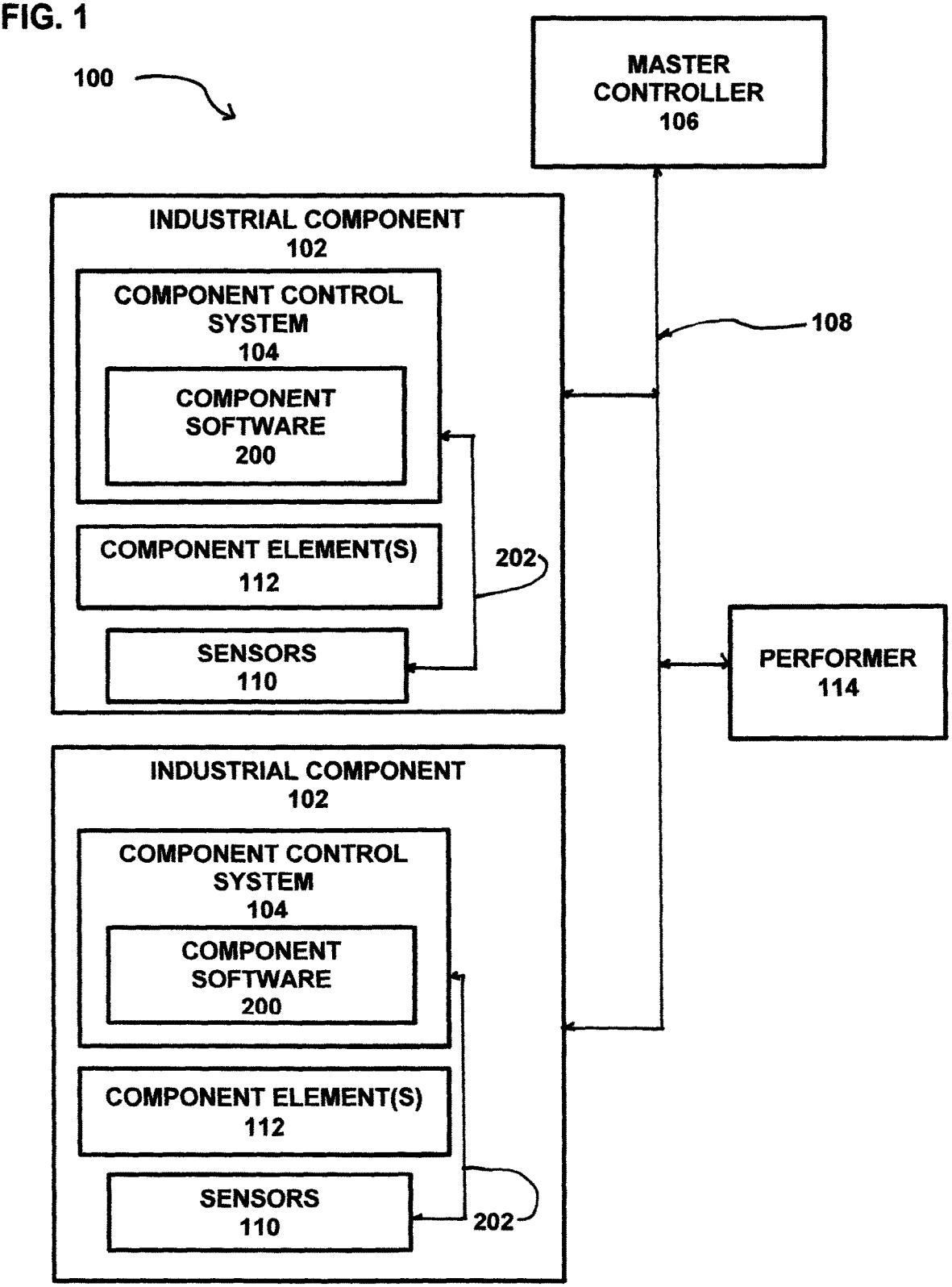
FIG. 1 is a schematic diagram of a preferred embodiment of the system of the subject invention showing an exemplary industrial system performing an industrial operation having one or more industrial components each having a component control system that receives data from one or more sensors and transmits the data through a communication network to a master controller, and further showing a performer for copying data being transferred through the communication network without impeding data being transmitted to the master controller.

The subject invention is a new and novel system and method for monitoring and analyzing industrial operations such that data is obtained from one or more sensors of one or more industrial components and transmitted to a master controller. The transmitted data is copied, and stored for analysis. In a preferred embodiment, the system operates such that data is obtained from one or more sensors of one or more industrial components and transmitted as a data stream through a communication network to a master controller. A performer in communication with the communication network operates to monitor the data stream traveling through the communication network and copies or mirrors data within the data stream without impeding the data stream Preferably, the copied data is then converted by a Structured Query Language (SQL) or other similar query-able language and stored in a query-able database of a databank. In another preferred embodiment of the invention, the performer includes a processor that operates to select all or one or more portions of data in the database and compares the data to reference data and determines if one or more industrial components or one or more particular component elements are not performing properly or are not properly performing their desired functions. In another preferred embodiment of the invention, an analyzer operates to make a predictive analysis using data from one or more of the industrial components and determines if the industrial component(s) or if one or more component element(s) require or will require maintenance to prevent failure or operational errors occurring in the relative near future, such as in a predefined time period. In a preferred embodiment, in order to speed up the real time analysis, the system operates to copy data that are in the form of data packets being transferred in a data stream through a communication network, appends metadata to each copied data packet, compresses and bunches the data packets together into network optimized sized bytes and stores them in a query-able database of a databank for future analysis.

In a preferred embodiment of the invention the analyzer operates to select all or portions of the data copied by the performer and stored in the query-able database and makes a comparison of the data to reference data and determines using the comparison if an industrial component or an industrial element is properly performing its desired function or functions or operating within (or outside) its operating specification. In another preferred embodiment of the analyzer operates to perform a predictive analysis by making a comparison of the data copied by the performer for a particular industrial component (or a particular component element) to reference data, such as data obtained from one or more industrial components (or component elements) prior to such components performing an error or having a malfunction. The comparison is then used to predict the probability of the particular component (or the particular component element) having an error or a malfunction during a predefined time period. Preferably, the analyzer transmits a warning and/or transmits a recommendation, such as to a human-machine interface display, prior to the error or malfunction.

As used herein the term "industrial system" includes manufacturing, assembly, packaging, transporting, and production systems including, but not limited to, manufacturing operations and/or assembly operations and/or packaging, retrieval, storage and/or other systems and/or devices. As used herein the term "industrial operation" includes manufacturing processes, transporting processes, and production processes including, but not limited to, manufacturing and/or assembly processes and/or transporting processes. As used herein the term "industrial component" refers to one or more individual apparatus or devices, typically having one or more industrial elements that operate to perform an industrial operation. As used herein the term "master controller" refers to a control system such as a proportional-integral-derivative control system (PID), a distributed control system (DCS) and programmable logic control system (PLC) and their functional successors (i.e. programmer automation controllers, PC based control, etc.) that regulates, monitors and/or controls the operation of one or more industrial components operating in an industrial system. As used herein the term "component control system" refers to the individual component control system that functions to control the individual operation of an industrial component. It should be understood that the master controller and/or one or more of the individual component control systems can be at the same physical location (i.e. same proximate factory floor or even built into the same processor (such as a chip having a different core)) or at different locations. As used herein, the term "software" refers to any form of programmed machine-readable language or instructions (e.g., object code) that, when loaded or otherwise installed, provides operating instructions to a machine capable of reading those instructions, such as a computer or processor. It should be understood that the software of the present invention can be stored or reside on, as well as be loaded or installed from, one or more floppy disks, CD ROM disks, hard disks or any other form of suitable non-volatile electronic storage media. The software can also be installed by downloading or other form of remote transmission, such as by using Local or Wide Area Network (LAN or WAN)-based, Internet-based, web-based or other remote downloading or transmission methods. As used herein the term "reference data" refers to data, such as but not limited to data for a particular industrial component or component element obtained from a different time segment, or historical data, or data obtained from one or more other industrial components (or one or more other component elements) that are performing the same or similar functions or are the same or similar in design and operation, or operating specifications such as operating or design specifications for the same or similar industrial component (or component element). As used herein the term "current data" refers to data taken in real time or during a defined time segment (a particular time range that an industrial component is operating) and the term "historical data" refers to reference data taken during a time segment that is earlier or prior to the time segment of the current data.

Figure 2:
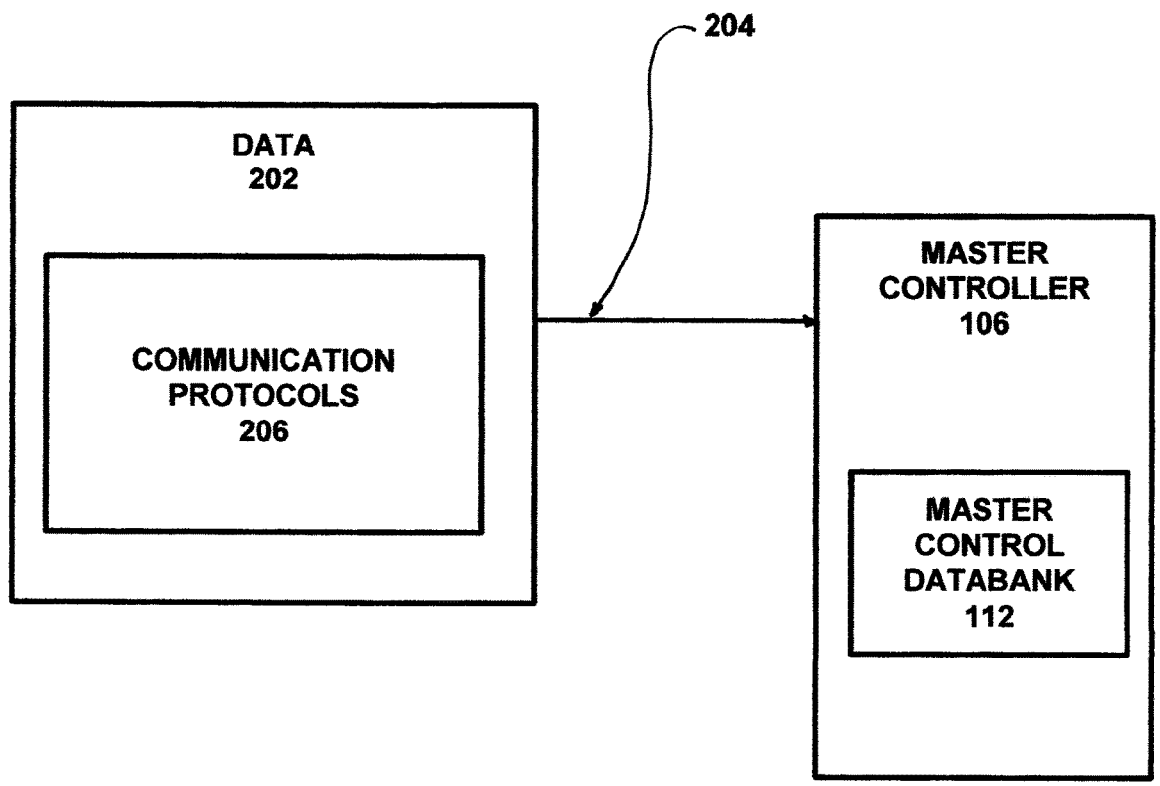
FIG. 2 is a schematic diagram of the industrial system of FIG. 1 showing data including communication protocols being transmitted as a data stream to a master controller.

In a preferred embodiment of the invention an exemplary industrial system 100, is schematically illustrated in FIGS. 1 and 2, and comprises one or more industrial components (or nodes) 102 performing a specific task and each having a component control system 104 that includes component software 200 that functions to control the operation of the industrial component 102 and to receive instructions from a master controller 106 through at least one communication network 108. The component control system 104 for each industrial component 102 further operates to receive data 202 from one or more sensors 110 and transmits the data 202 as a data stream 204 (FIG. 2) to the master controller 106 through the communication network 108. The master controller 106 operates to continuously receive data 202 from the data stream 204 and monitors and controls the overall operation of the industrial system 100 and the individual industrial components 102 comprising the industrial system 100. Preferably, data 202, such as data from a plurality of sensors 110 that operate to obtain various operating measurements from various component elements 112 of an industrial component 102, are communicated to the component control system 104 and transmitted to the master controller 106 as a data stream 204 through at least one communication network 108. In one preferred embodiment, the master controller 106 is a standard automation controller, such as a programmable logic controller (PLC) that operates using a high-level programming language to generate control commands that are passed to the various individual component control systems 104 that are in electrical communication through the communication network 108, such as by a plurality of cables and wires, or through a wireless system. It should be understood that the master controller 106 can also comprise various other computing hardware such as central processing units (CPU's), graphics processing units (GPU's), digital signal processors (DSP's), microprocessors, field programmable gate arrays (FPGA's), very large scale integration (VLSI) systems, complex programmable logic devices (CPLD's), or systems on chips (SOC's), and/or other such data processing and/or control devices.

In operation, data 202 is transmitted to and from the individual component control systems 104 and the master controller 106 as a data stream 204 utilizing communication protocols 206 for digital messaging through the communication network 108 and for exchanging data between various industrial components 102 and the master controller 106. The communication protocols 206, such as, but are not limited to, EtherNet/IP, ControlNet, DeviceNet, Profinet, and Common Industrial Protocol (CIP), operate as the rules for transmitting messages and/or data 202, such as in the form of data packages, between the various control systems. It should be understood that other communication protocols can be utilized and are within the scope of the invention. Component software 200 utilized by the various industrial components 102 also operate to configure the transmission of the data 202 such that the transmission is efficient for the particular component 102 and are within the bounds of the communication protocols 206 for communicating with the master controller 106.

Figure 3:
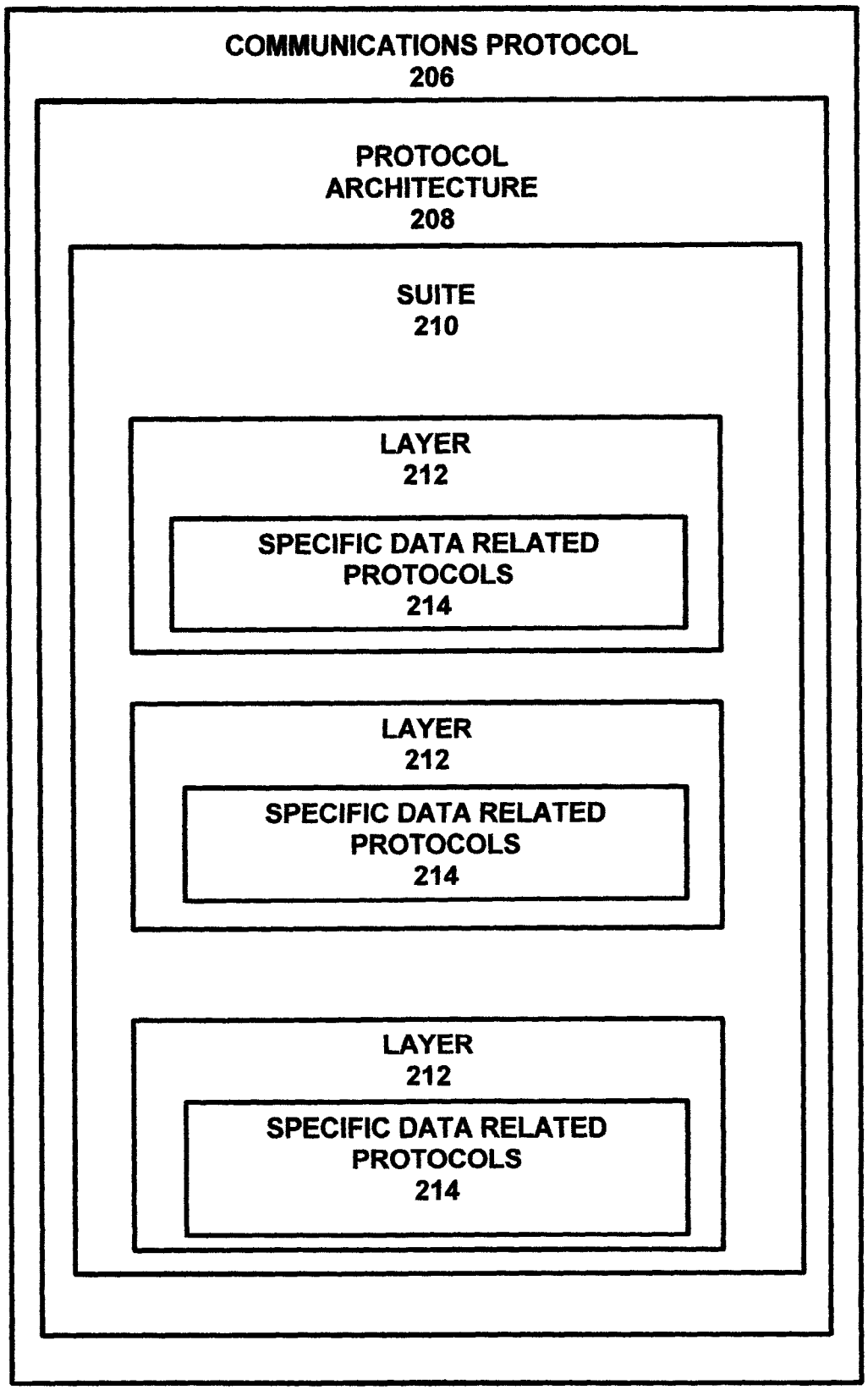
FIG. 3 is a schematic illustration showing an exemplary communications protocol having a protocol architecture comprising a suite formed having one or more layers that represent various operations and each having one or more specific data related protocols for transport through the communication network.

In a preferred embodiment, the industrial system 100 utilizes the communication protocol 206 known as Common Industrial Protocol (CIP) which is generally used for industrial automation applications. As schematically illustrated in FIG. 3, in a preferred embodiment the communications protocol 206 has a protocol architecture 208 that includes a suite 210 formed in layers 212 that represent various operations and have specific functions, each having one or more specific data related protocols 214 for transmitting, receiving and storing data 202 being transferred through the communication network 108, such as, but not limited to, internal closed communication networks or external communication networks, such as the Internet. Manufacturing and component data 202 in the form of data packages are transmitted from the various industrial component control systems 104 through the communication network 108 to the master controller 106 where the data 202 is captured and stored in a master control databank 112. During operation of the industrial system 100, the master controller 106 operates to monitor the various conditions of the industrial system 100 including the status of the various operations being performed by each industrial component 102 and can operate to adjust the operation of each industrial component 102 or send out a warning in the event the system is not operating properly.

Figure 5:
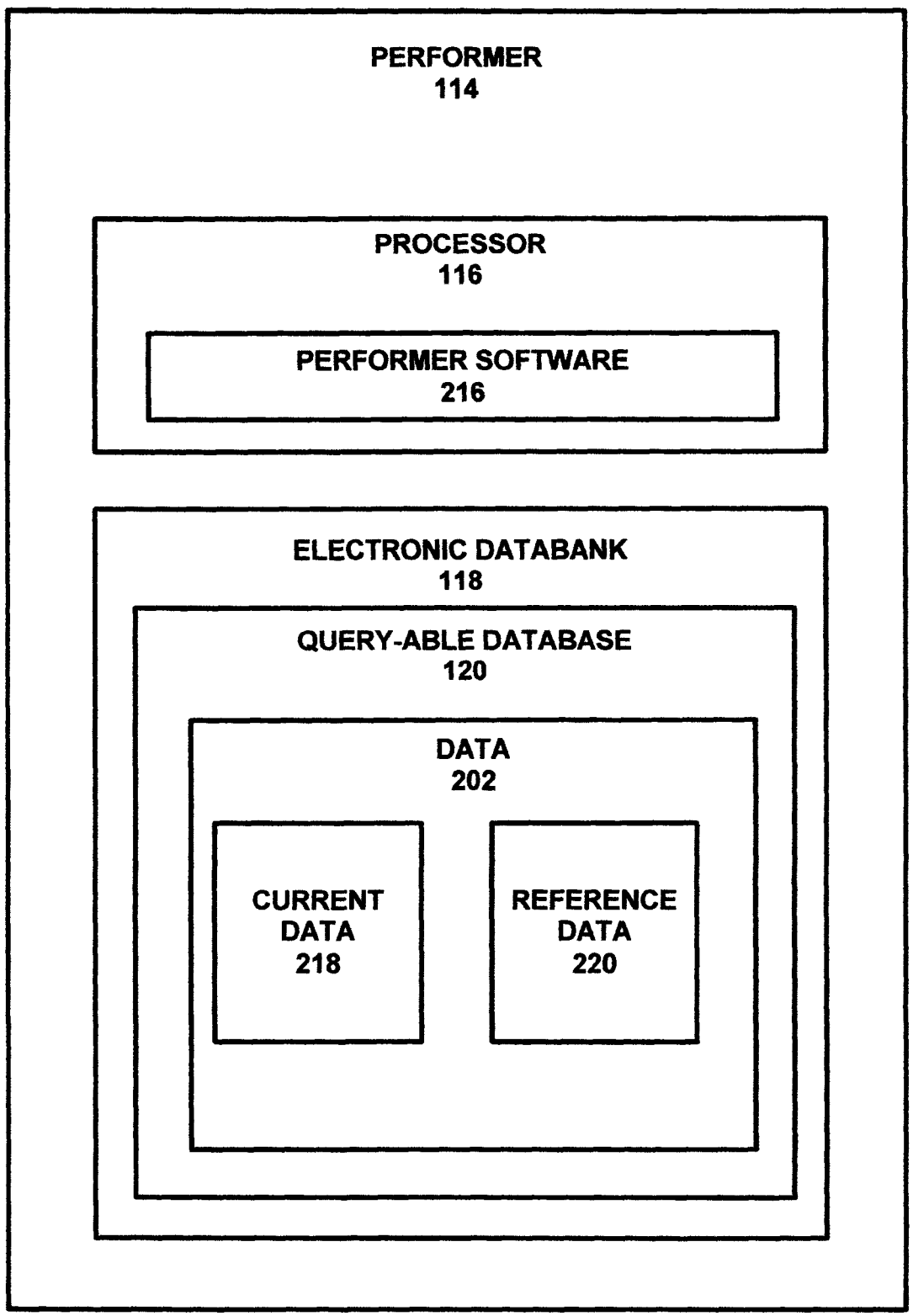
FIG. 5 is a schematic illustration showing an exemplary performer having a processor for performing performer software and an electronic databank with a query-able database for storing data, both current data and reference data (historical data)

As illustrated in FIGS. 1 and 5, the industrial system 100 further comprises a performer 114 in communication with the communication network 108 and includes a processor 116 having performer software 216, and an electronic databank 118. The electronic databank 118 preferably includes at least one query-able database 120, such as a SQL database, a Hadoop database, and other such query-able databases that allow users to easily track and store data 202, both current data 218 (data currently being transmitted and copied from the data stream) and reference data 220, such as historical data gathered (copied) from the data stream 204 traveling along the communication network 108 during an earlier or a prior time segment for the same or similar industrial components (and/or component elements).

Figure 4:
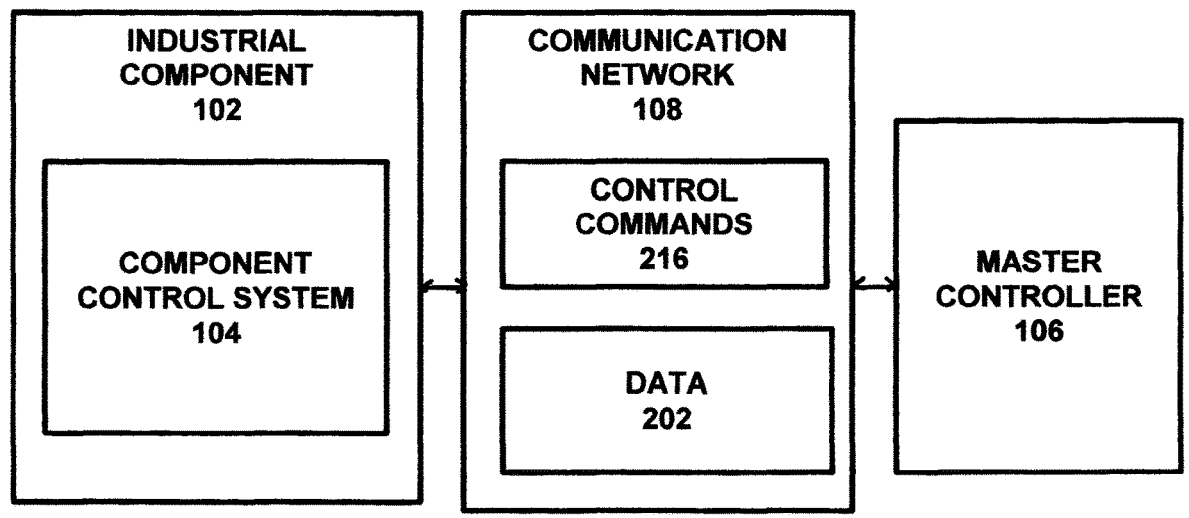
FIG. 4 is a schematic illustration showing an industrial component having a component control system in communication with a communication network for transmitting data to a master controller and for transmitting control commands from the master controller to a component control system.
Figure 6:
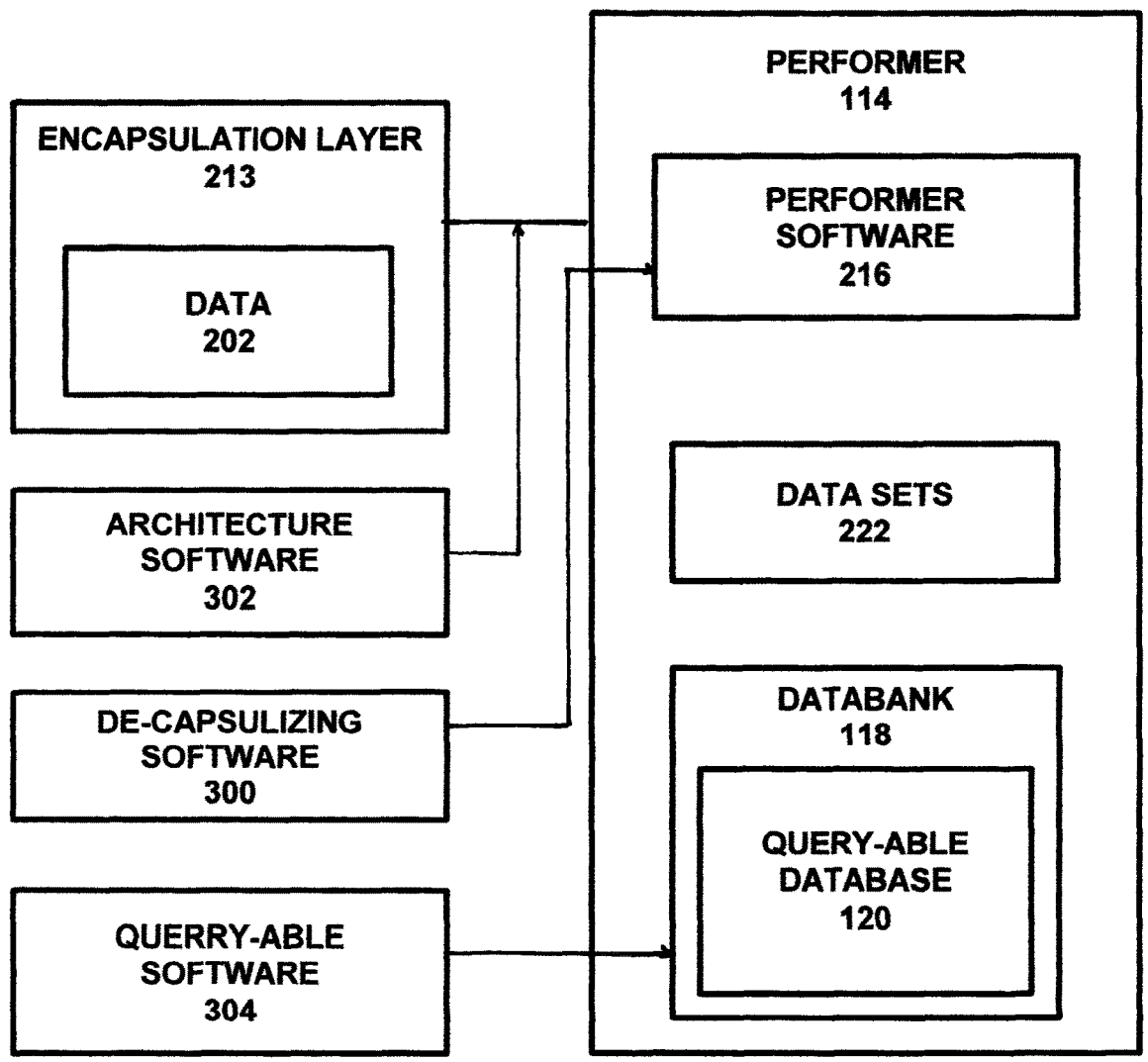
FIG. 6 is a schematic illustration showing a protocol architecture layer in the form of an encapsulation layer having data to be copied by the performer and formed into data sets and stored in the databank.
Figure 7:
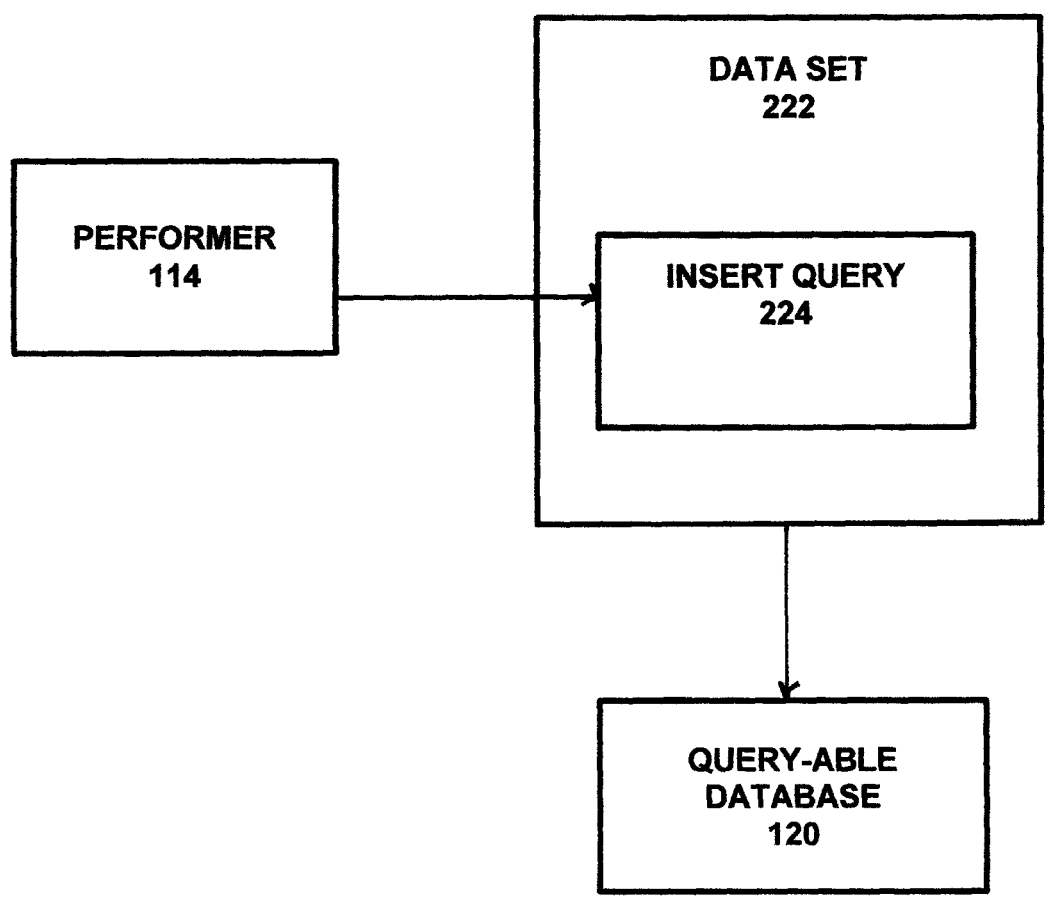
FIG. 7 is a schematic illustration of a data set having an insert query placed within the data set by the performer and stored in a query-able database.

Referring to the figures and specifically to FIGS. 3, 4 and 6, in a preferred embodiment of the invention one layer 212 of the protocol architecture 208 is in the form of an encapsulation layer 213 whereby data 202 in the form of data packages are wrapped within the encapsulation layer 213 and transported through the communication network 108. In operation, the performer 114 operates to monitor the data 202 traveling through the communication network 108 and copies or mirrors the data 202 contained within the encapsulation layer 213 without impeding the data stream 204. Once copied, the performer software 216 (FIG. 5) operates to de-capsulize or un-wrap the data 202 from the encapsulation layer 213 of the protocol architecture 208 using conventional de-capsulizing software or procedures 300 provided by a communication network's vendor. The performer 114 further operates to conventionally parcel out and store the data 202 in the electronic databank 118 using architecture software or process 302 outlined by the specific protocol architecture specification. This process is continuously repeated until sufficient data 202 has been obtained to form one or more sets of data 222. Each data set 222 is then converted by a Structured Query Language (SQL) or other such query-able language, and stored in the electronic databank 118 as a query-able electronic database 120 using the standard query software or procedures 304 provided by the format vendor(s). For an exemplary illustration, as illustrated in FIG. 7, to convert a set of data 222 into a query-able format for usage in the query-able database 120, the performer 114 would operate to construct an insert query 224 where each data field in the sets of data 222 corresponds to zero or more fields in the query-able database 120 which permits the data 202 contained within the sets of data 222 to be easily queried. Once the data 202 is in the query-able format and stored in the query-able database 120, one can query the data, aggregate the data, print out reports of the data, run mathematical analysis of the data, use the data in another business process, and other such uses.

Figure 8:
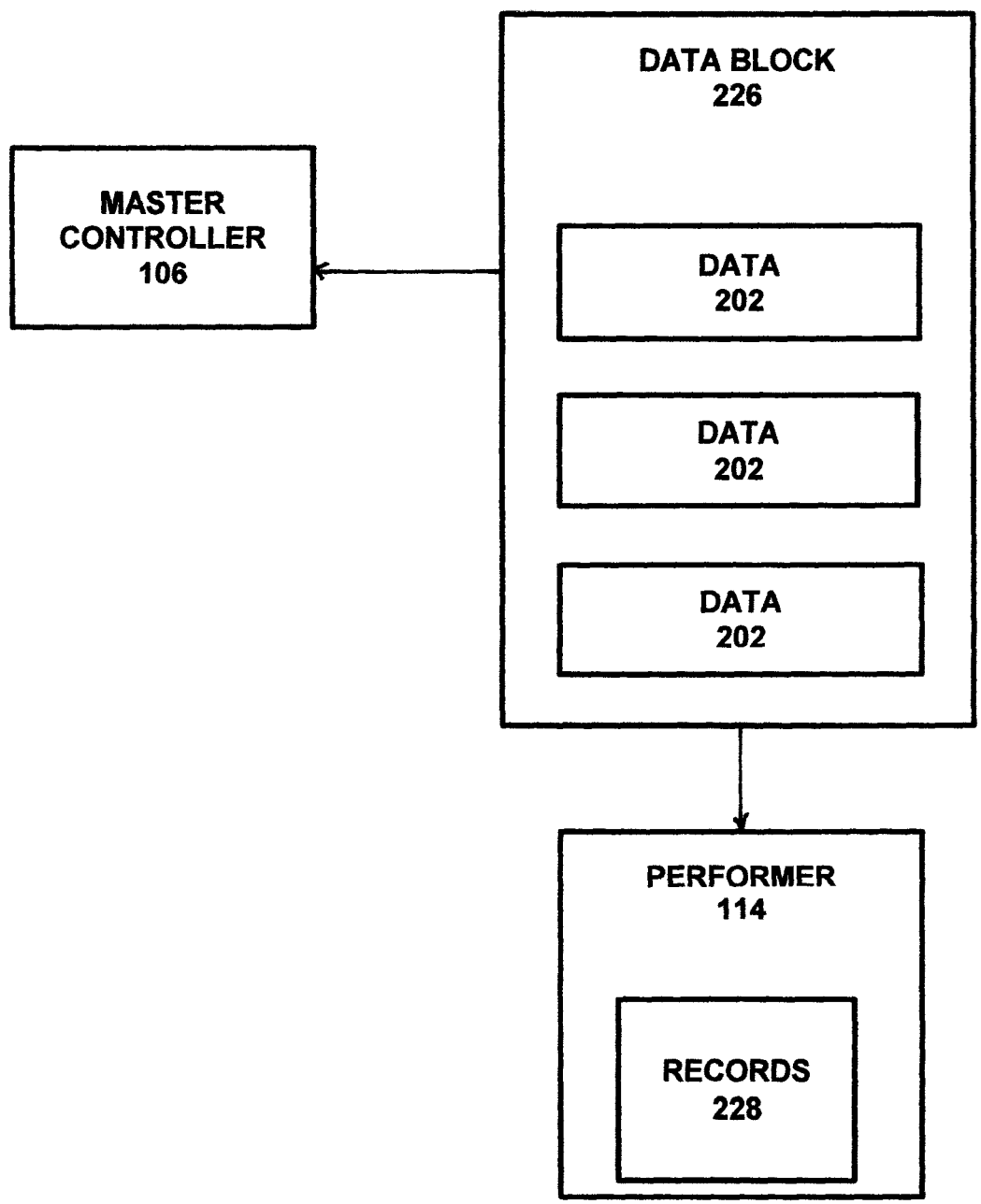
FIG. 8 is a schematic illustration of another preferred embodiment of the invention whereby the component control systems operate to block together data and compress the blocks of data into an optimal size for transmittal to the master controller through the communications network and which can be copied by the performer for storage in a query-able database of a databank.

It should also be understood that depending on the desired amount of data 202 to be copied and stored, the performer 114 and the query-able database 120 could be overloaded or is operating relatively slowly. Accordingly, in another preferred embodiment of the invention, as illustrated in FIG. 8, the component software 200 of the individual component control systems 104 are programmed to form the data 202 into blocks 226 and compress the blocks of data 202 into an optimal size and transmitted to the master controller 106 through the communications network 108. The performer 114 can then operate to monitor the blocks 226 of data 202 traveling through the communication network 108 and copies or mirrors the data blocks 226 within the data stream 204 without impeding the data stream 204 and stores the data blocks 226 in the query-able electronic database 120 as a group of records. Accordingly, multiple blocks 226 of data 202 can be copied in an efficient manner to minimize the likelihood of overwhelming the performer 114 or the query-able database 120 as well as improving processing speed. It should be understood that the performer 114 can also operate to decompress the blocks 226 of data 102 and store them in the query-able database 120 as a group of records 228. It should also be understood that in order to further increase the speed of processing the performer 114 can operate to decompress multiple blocks 226 of data 102 at one time.

Figure 9:
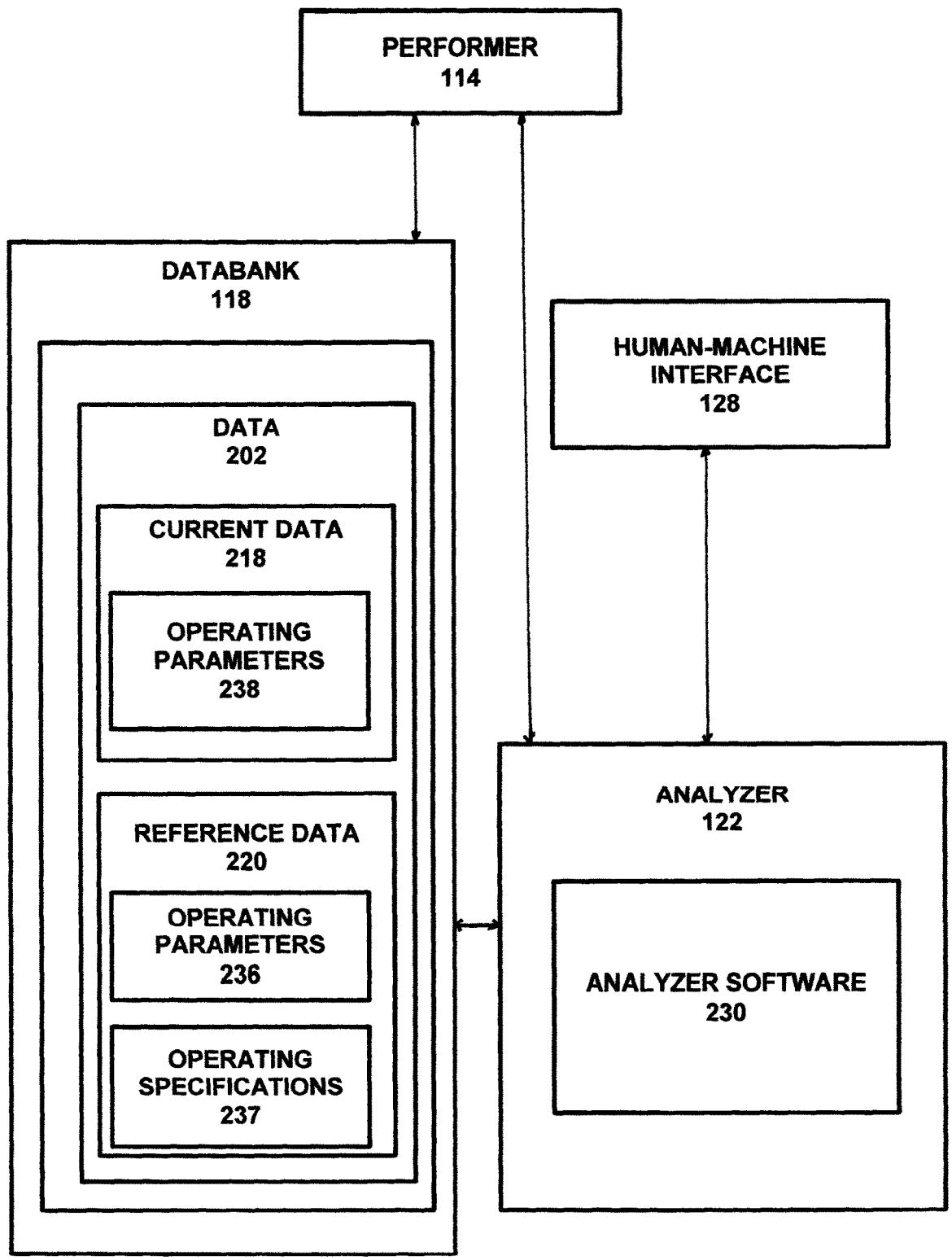
FIG. 9 is a schematic diagram of another exemplary industrial system showing the performer in communication with a human-machine interface (monitor) and an analyzer that operates to analyze data, such as by performing a statistical or predictive analysis, contained within the query-able database.
Figure 10:
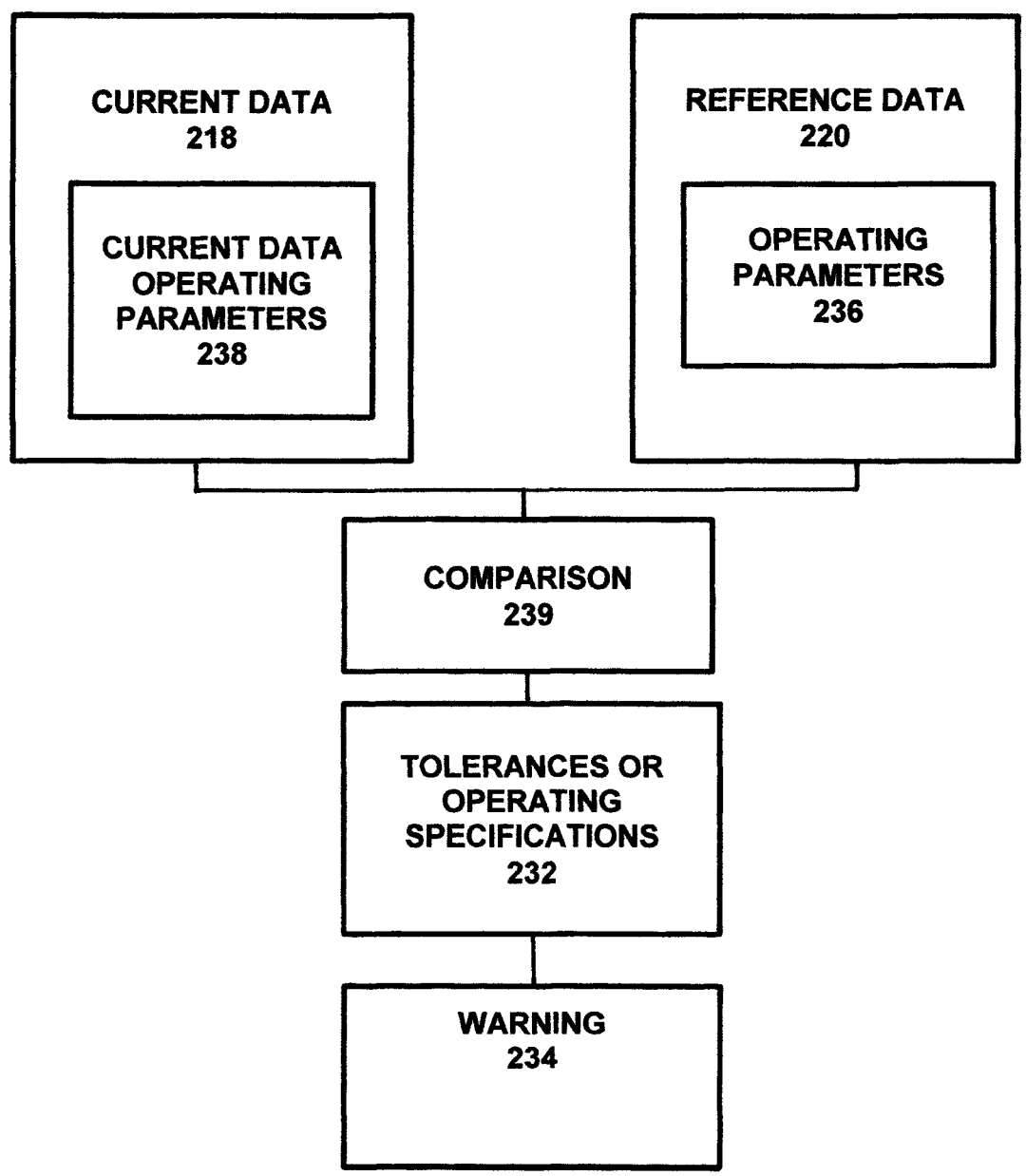
FIG. 10 is a schematic diagram showing current data and reference data (such as historical data) being used to make a comparison by the analyzer.

Referring to FIGS. 1, 9 and 10, the performer 114 is in communication with an analyzer 122 having analyzer software and/or firmware 230 that operates to analyze data 202 (such as by performing a statistical or predictive analysis) contained within the query-able database 120 of the electronic databank 118. In a preferred embodiment, current data 218 that is copied from the data stream 204 and stored in the query-able database 120 (such as data from one or more sensors 110 monitoring the operation of one or more industrial components 102) is compared to reference data 220. For an exemplary illustration, current data 218 of a manufacturing operation being performed by an industrial component 102 is copied by the performer 114 and stored in a query-able database 120 for that industrial component 102. The analyzer 122 operates such that a comparison 239 is made of the current data 218 to reference data 220 for that industrial component 102 (reference data such as historical data from other similar industrial components (or component elements)). In the event the current data 218 is outside predetermined normal operating specifications (tolerances) 232, a warning 234 is issued prior to failure of the industrial component (or a component element). In another exemplary illustration, current data 218 of a manufacturing operation being performed by an industrial component 102 is copied by the performer 114 and stored in a query-able database 120 for that industrial component. The analyzer 122 operates such that a comparison 239 is made of the current data operating parameters 238 to operating parameters 236 of reference data 220 for that industrial component (or component element or other similar industrial components (or component element)). It should be understood that such operating parameters 236 of the reference data 220 are parameters that were reached just prior to an industrial component failure (data from sensors just prior to such failure). In the event current operating parameters 238 from an industrial component 102 begins to approach the operating parameters 236 within a predefined operating tolerance 232, a warning 234 is generated and transmitted to an operator that the industrial component or a component element is near failure, requires servicing, or is not performing properly. For another exemplary illustration, current data 218 of a manufacturing operation being performed by an industrial component 102 is copied by the performer 114 and stored in a query-able database 120 for that industrial component. The analyzer 122 operates such that a comparison is made of the various operating parameters 238 of the current data 218 to corresponding operating specifications 232 to determine if the difference between the current operating parameters 238 of the current data 218 and the reference data 220 operating specifications 237 (FIG. 9) are outside allowable predetermined tolerances 232. In the event the difference between the parameters 238 of the current data 218 and the operating specifications 237 are outside (or approaching being outside) the predetermined tolerances 232, a warning 234 is generated and transmitted to an operator.

Figure 11:
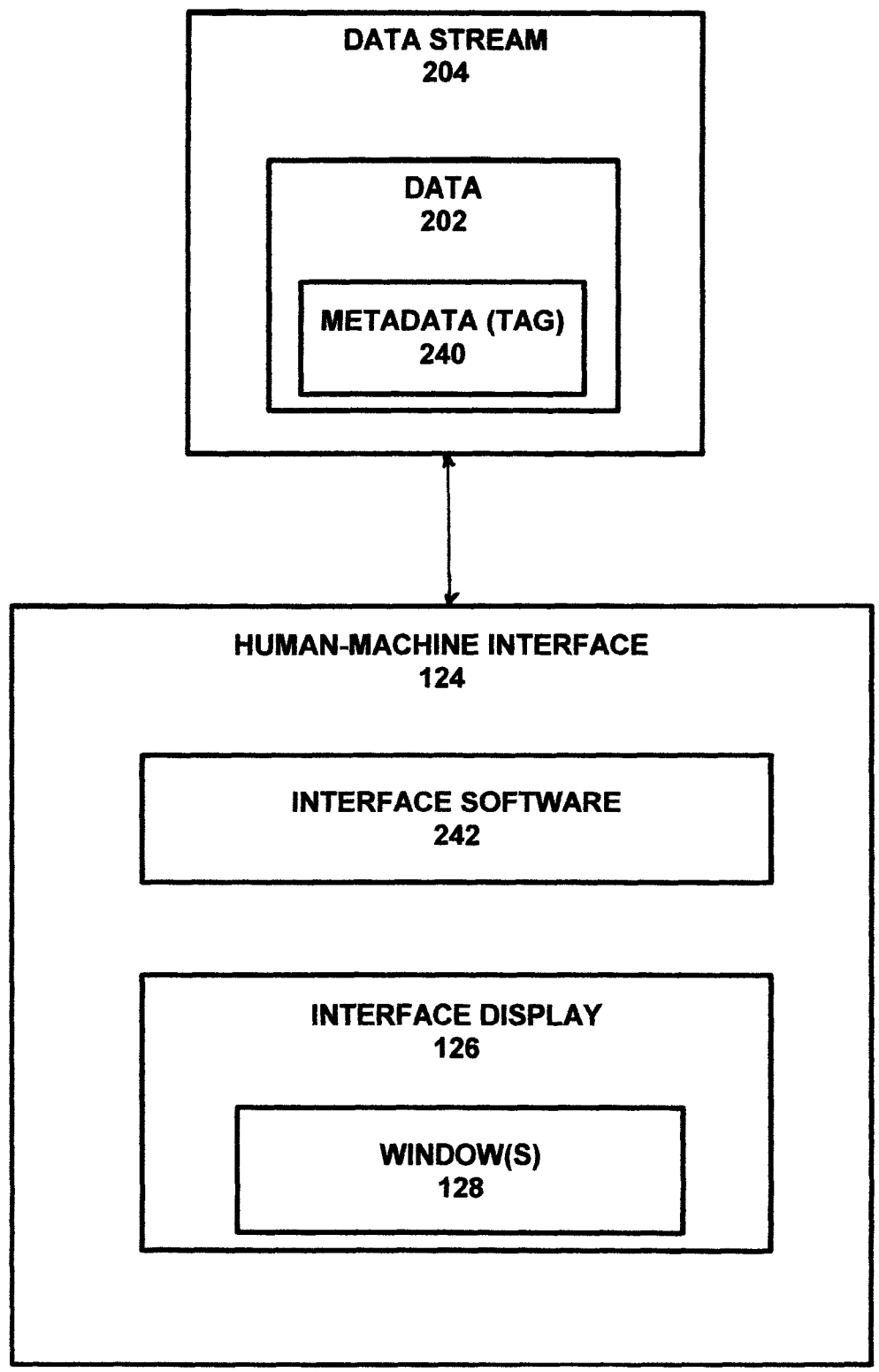
FIG. 11 is a schematic diagram showing another preferred embodiment of the invention showing individual a data stream and data within the data stream having a metadata tag and a human-machine interface in communication of the data stream.

In a preferred embodiment of the invention, as illustrated in FIGS. 1, 9 and 11, the analyzer 122 includes or is in communication with a human-machine interface 124 that allows an operator to select what metadata (tags) 240 to select in copying data 202 from the data stream 204. Preferably, the human-machine interface 124 includes interface software 242 that communicates and cooperates with the performer software 216 (FIG. 5) and is an interactive, menu and event driven system that further cooperates with an interface display 126 for creating and using conventional type of prompt, dialog, and entry windows 128 to guide a user to enter information. Thus, the industrial system 100 provides an interactive communications interface for facilitating communications and information exchange between the human-machine interface 124 and the analyzer 122 and the performer 114. It should be understood that an operator can select what metadata (tags) 240 to utilize in selecting data 202 that closely aligns with the needs for the analyzer 122 to make a predictive analysis. In addition, by selectively identifying the metadata (tags) 240 to be used, a single analyzer 122 can be used for multiple industrial systems.

It should now be apparent that the system and method for monitoring and analyzing industrial operations permits predictive analysis to be conducted by performing data queries and examining for recurring patterns and performing conventional statistical analysis using such recurring patterns to predict the probability of similar events happening in the future. For an exemplary illustration, data showing that a temperature reading on an industrial component began to show an increase over time prior to a bearing on a gear began to fail. By determining this temperature increase is statistically predictive, the analyzer can be programmed to monitor new data and identify such temperature increase thereby identifying and providing a warning to an operator that the industrial component associated with the new data may be experiencing a near future bearing failure. Accordingly, maintenance can be performed on the industrial component prior to such failure.

Figure 12:
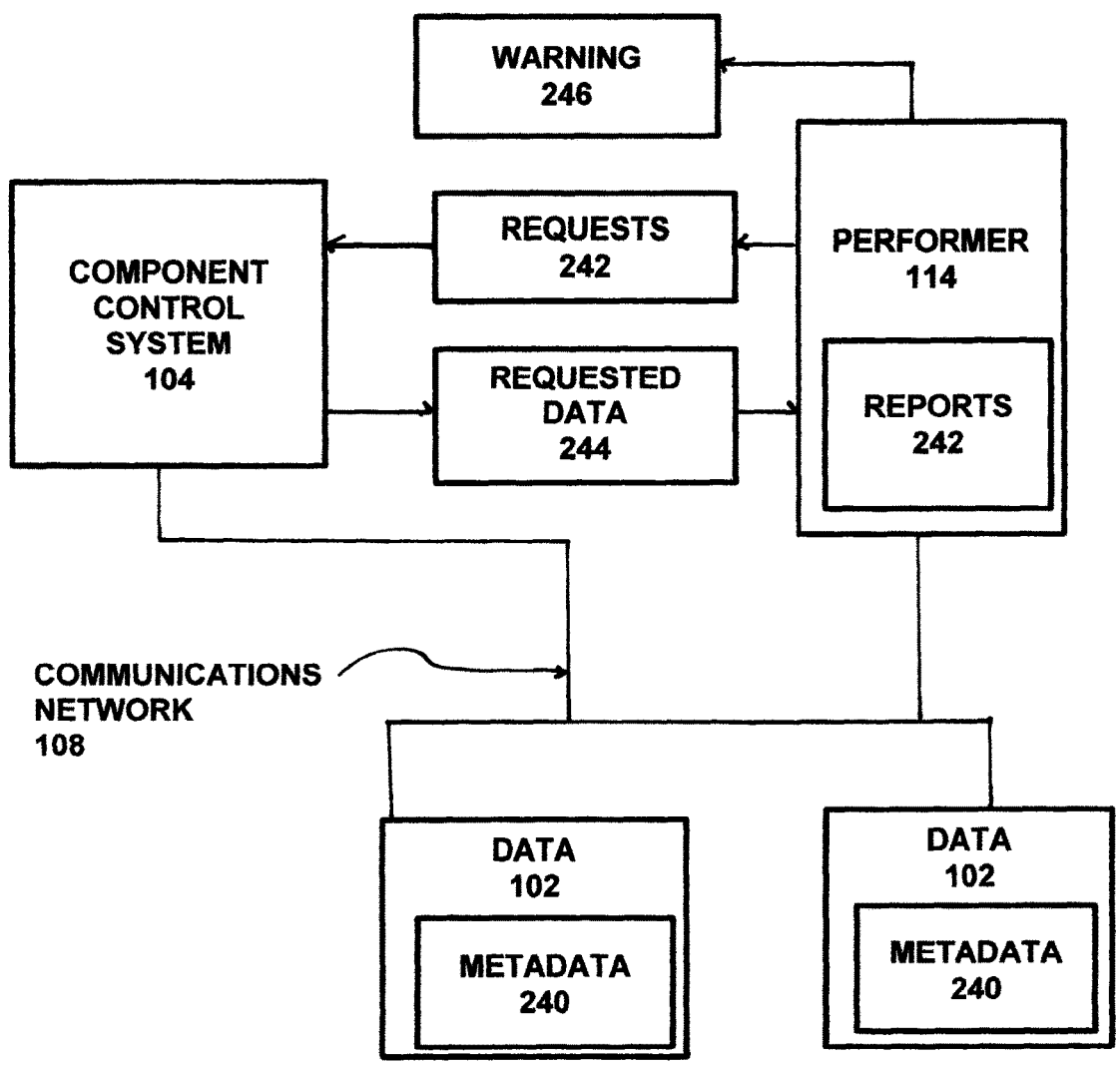
FIG. 12 is a schematic diagram showing the performer monitoring data being transmitted through the communications network and sending requests for specific data to one or more industrial components.

In a preferred embodiment of the invention, as illustrated in FIG. 12, the performer 114 further operates to monitor the communication network 108, such as monitoring metadata (data tags) 240 every millisecond, for identifying specific data (information). In the event the performer 114 has not identified and copied certain desired data 202 within a preset period of time (time segment), the performer 114 can send requests (pings) 242 to one or more individual component control systems 104 through the communication network 108 directing the targeted component control system 104 to transmit the requested data 244 through the communication network 108. In another preferred embodiment, the performer 114 can further operate to send such requests 242 to identify if data loss or errors are occurring in the data stream 204. In the event of an error or data loss is identified a warning 246 can be displayed on the interface display 126 of the human-machine interface 124 allowing an operator to investigate and correct the problem.

Figure 13:
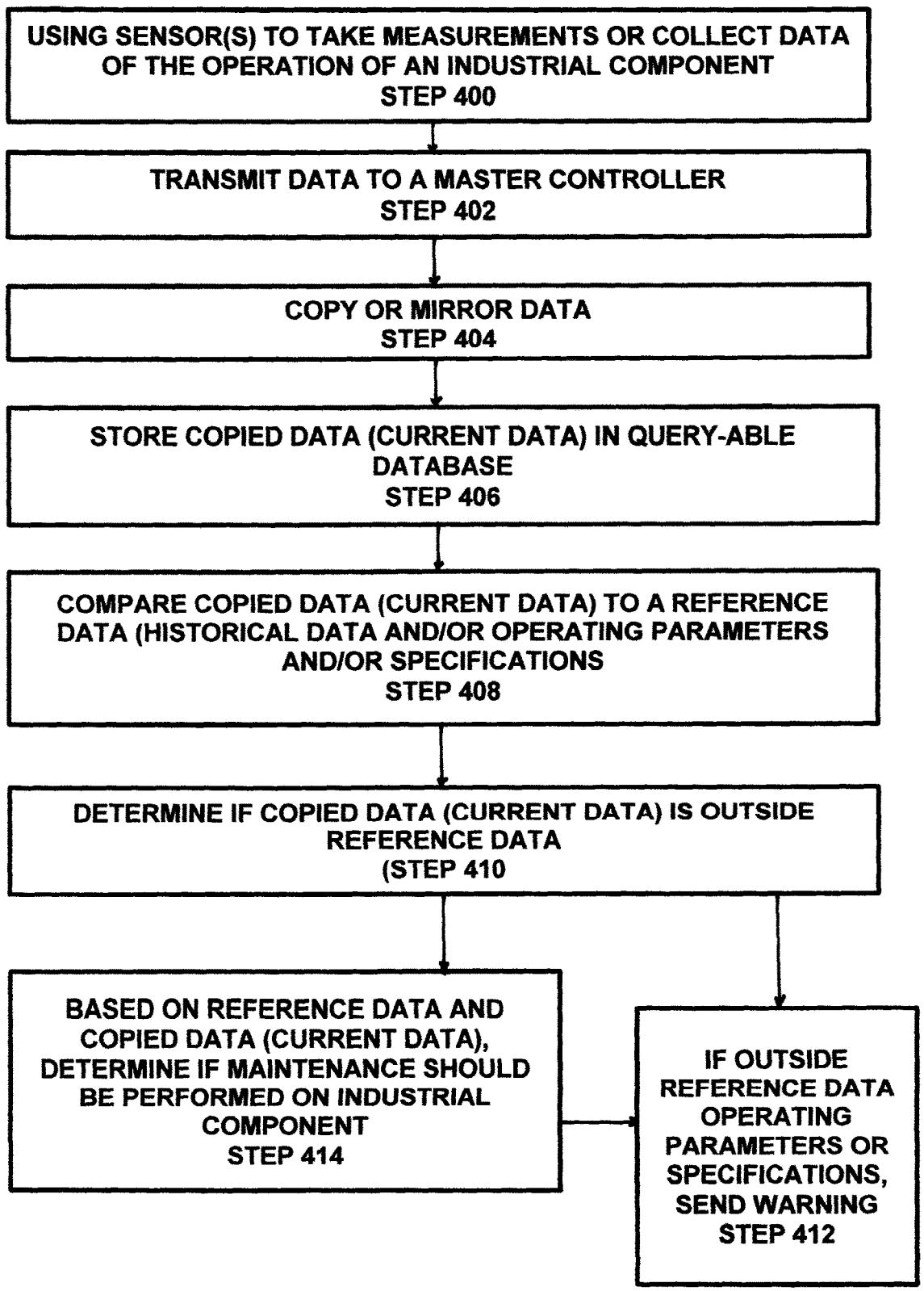
FIG. 13 is a exemplary flow diagram showing methodology of a method for monitoring and analyzing industrial operations to determine or predict if one or more industrial components is not performing properly or needs or may soon need maintenance.
Figure 14:
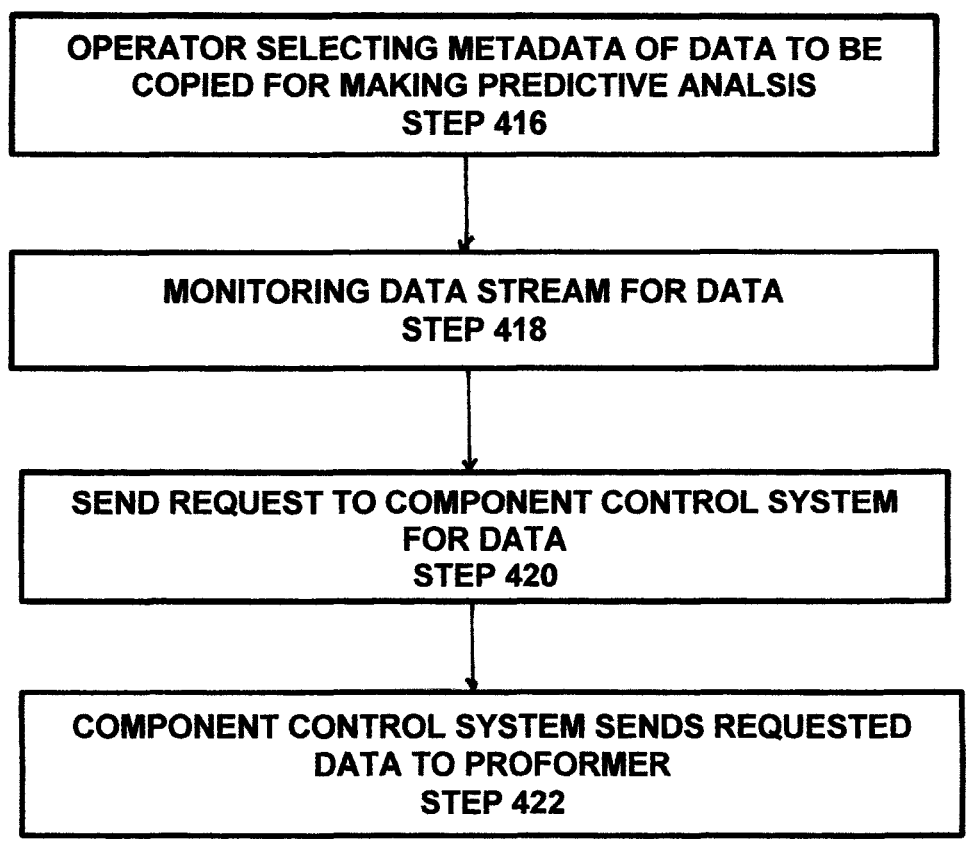
FIG. 14 is an exemplary flow diagram showing the methodology of the subject invention illustrating an operator selecting metadata for data that is to be copied for making predictive analysis and for sending a request for data and transmitting the requested data.

Another preferred embodiment of the invention is a method for monitoring and analyzing industrial operations is illustrated in FIG. 13 and comprises the steps of using one or more sensors to take measurements or collect data on one or more industrial components or component elements of at least one industrial component (step 400) and transmitting the data as a data stream through at least one communication network to a master controller (step 402). A performer operates to copy or mirror the data in the data stream without disturbing, impeding, interfering or disrupting the fluid stream (step 404) and stores the data in a query-able database (step 406). An analyzer operates to compare the copied data to reference data (step 408) such as historical data or stored operating parameters or operating specifications and based on the comparison determines if the copied data is outside predetermined or defined operating specifications (tolerances) (step 410). In the event the copied data is outside the predetermined or defined operating specifications (tolerances), the analyzer transmits a warning (step 412). In another preferred embodiment of the invention, as illustrated in FIG. 14, the method comprises the step of analyzing the copied data and comparing it to reference data to determine if the industrial component requires maintenance (step 414). In another preferred embodiment of the invention the method comprises the step of an operator selecting metadata (tags) for selecting data to be copied that closely aligns with the needs for the analyzer in making a predictive analysis (step 416). In another preferred embodiment the method includes the step of monitoring data in the data stream (step 418) and the performer sending one or more requests for data to a component control system (step 420) and the component control system transmitting the requested data through the communications network (step 422).

Figure 15:
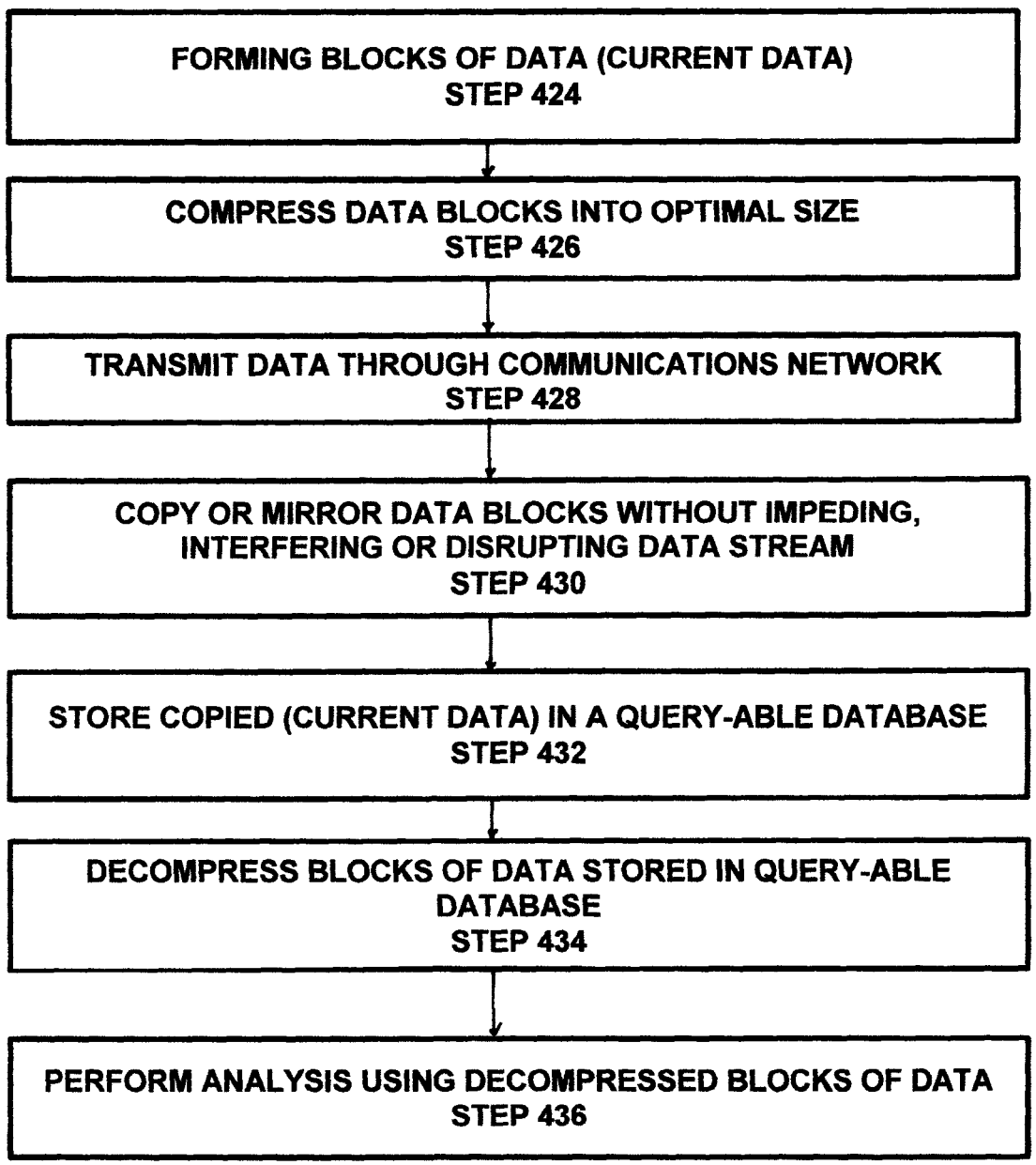
FIG. 15 is an exemplary flow diagram showing the methodology of the subject invention illustrating forming blocks of data, compressing the blocks of data and transmitting the blocks of data through the communications network, copy the blocks of data without impeding or interfering or disrupting the data stream, decompressing the blocks of data and performing an analysis using the decompressed blocks of data.

In another preferred embodiment of the invention, as illustrated in FIG. 15, the component software of the individual component control systems are programmed to form the data into blocks of data (step 424) and compress the blocks of data into an optimal size (step 426) and transmits to the master controller through the communications network (step 428). The performer operates to monitor the blocks of data traveling through the communication network and copies or mirrors the data blocks within the data stream without impeding, interfering or disrupting the data stream (step 430) and stores the data blocks in the query-able electronic database (step 432) as a group of records. The performer then operates to decompress the blocks of data (step 434) and uses the data for performing a predictive analysis (step 436).

Figure 16:
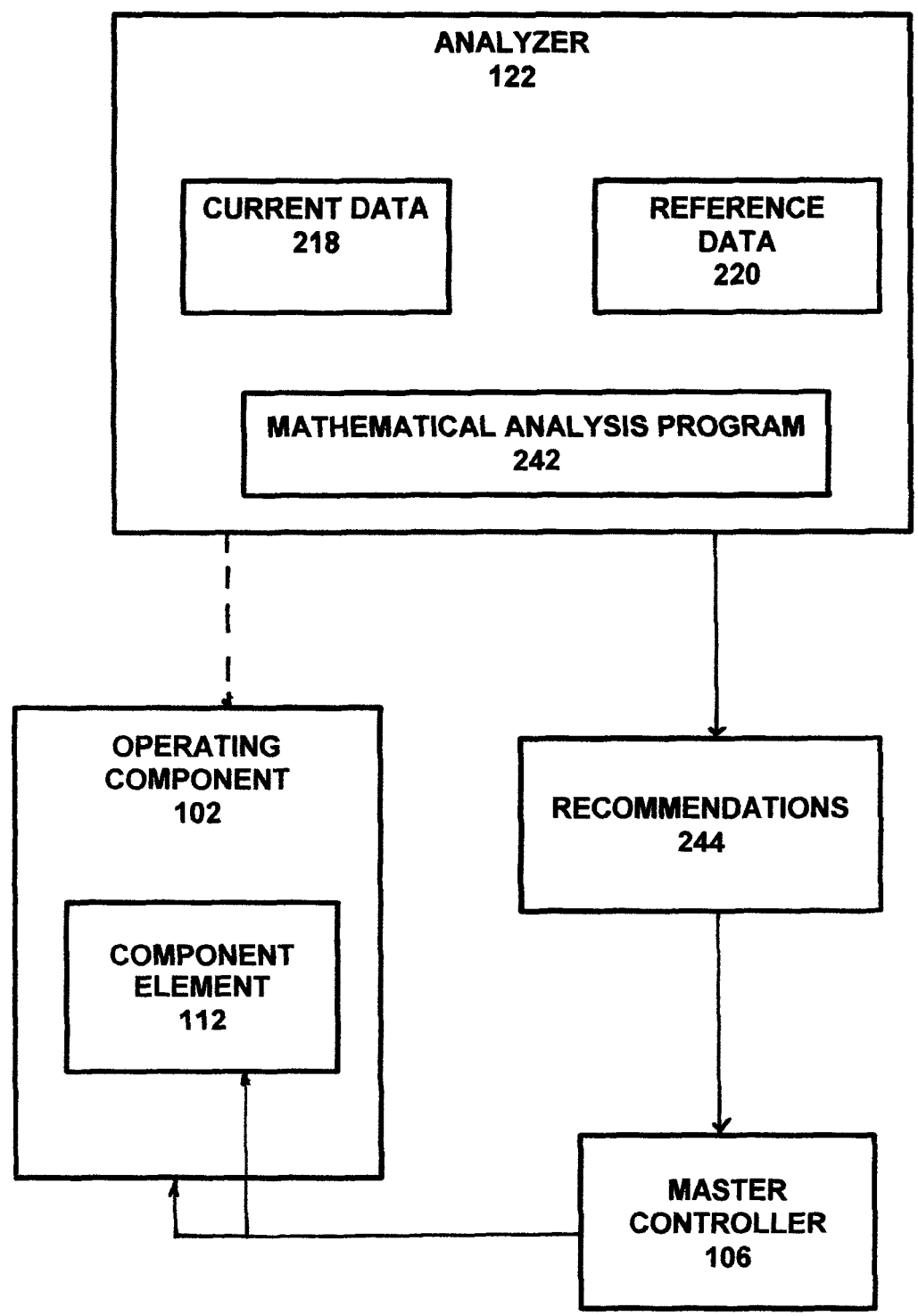
FIG. 16 is a schematic diagram showing the analyzer in communication with the master controller and transmitting recommendations to the master controller for modifying the operation of the industrial system.
Figure 17:
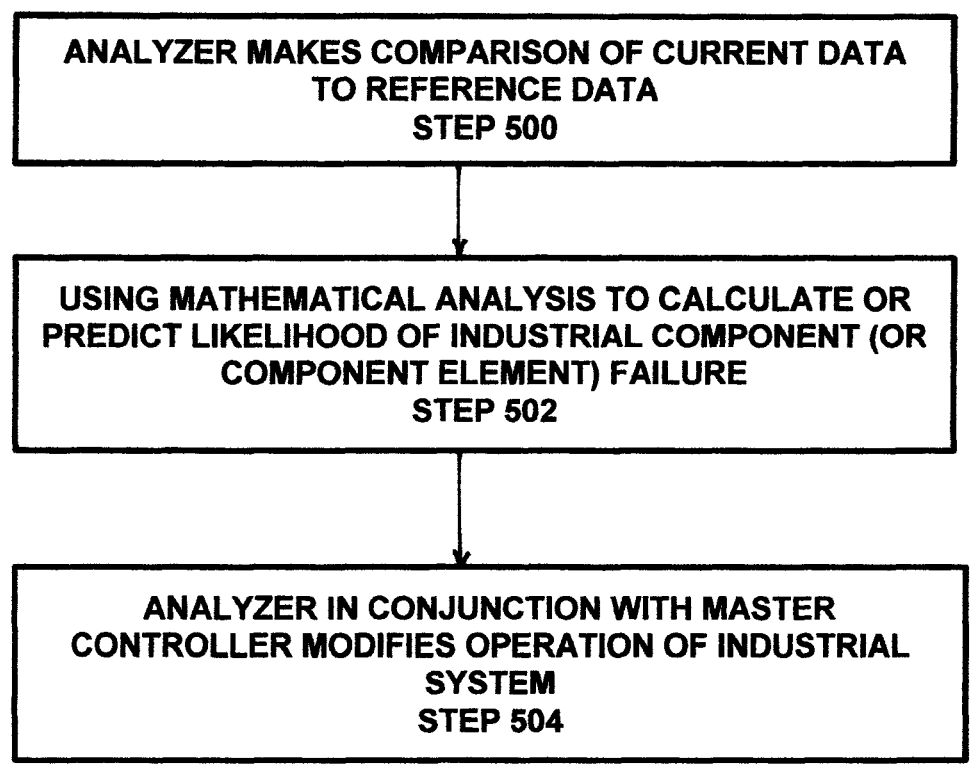
FIG. 17 is an exemplary flow diagram showing the methodology of the subject invention illustrating the analyzer in communication with the master controller for modifying the operation of one or more industrial components of the industrial system.
Figure 18:
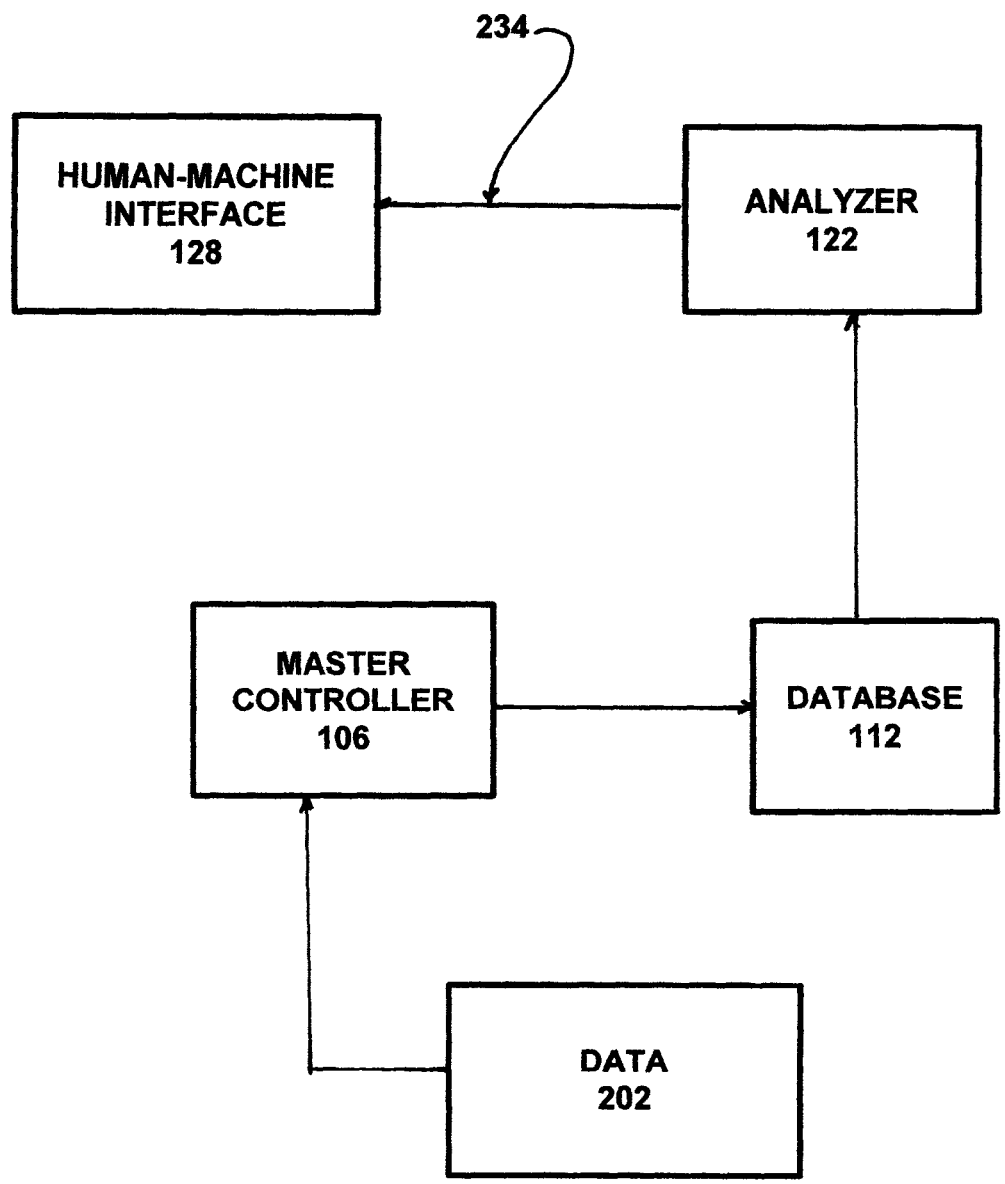
FIG. 18 is schematic diagram of another preferred embodiment of the invention showing a system comprising one or more industrial components having one or more sensors for obtaining data on the operation of the one or more industrial components and at least one communication network for transmitting the data to a master controller, and an analyzer that operates to analyze the data.

In a preferred embodiment of the invention, as illustrated in FIGS. 16 and 17, the analyzer 122 further operates to make recommendations 244 concerning the operation of an industrial component 102 (or component element 112). For a non-limiting exemplary illustration, current data 218 is compared to a reference data 220 (step 500) and using conventional mathematical analysis program 246, such as statistical analysis, a prediction analysis can be made or calculated as to the likelihood that the industrial component 102 (or component element 112) being evaluated will have an error or a failure within a defined time segment (step 502). Further, in a preferred embodiment of the invention, the analyzer 122 operates in conjunction with the master controller 106 to modify the operation of the industrial system 100, such as by slowing down or speeding up the operation of the various industrial components 102 or to activate or deactivate various industrial components 102 thereby allowing an operator to perform maintenance or repairs to one or more industrial components (or component elements) that are predicted to fail (step 504). Thus, in a preferred embodiment the analyzer operates to make a comparison of reference data for one or more industrial components that have sustained an error or malfunction with data copied by said performer for said at least one industrial component prior to having an error or malfunction and using conventional mathematical analysis operates to make recommendations with regard to said at least one industrial component based on said comparison and transmits the recommendations (such as modify the industrial system) to allow correction or to correct or allow corrections to be made to one or more of the industrial components.

Referring to FIG. 17, another preferred embodiment of the system 100 is shown whereby one or more industrial components 102 having one or more component elements 112 and one or more sensors 110 in communication with a master controller 106 through one or more communication networks 108. Data 202 (such as various measurements of one or more component elements 112) obtained by the sensors 110 is transmitted to the master controller 106 through the one or more communications networks 108. An analyzer 122 in communication with the master controller 106 operates to receive the data 202 directly through the master controller 106. It should be understood, however that the analyzer can receives the data 202 directly from the communication network 108 or through another component, such as a performer as previously described herein. The analyzer 122 includes analyzer software 230 (FIG. 9) that operates to select all or portions of said data 202 and makes a comparison 239 of the data 202 to reference data 220 and determines using said comparison 239 if said one or more industrial components 102 (or one or more component elements 112) are properly performing within predefined tolerances or operating specifications 232. If it is determined that one or more industrial components 102 (or one or more component elements 112) are not performing within predefined tolerances or operating specifications 232, the analyzer 122 (or the master controller 106) operate to send a warning 234 which is displayed on a human-machine interface 128. In another preferred embodiment of the invention, as illustrated in FIG. 16, the analyzer 122 further operates to make recommendations 244 concerning the operation of an industrial component 102 (or component element 112). For a non-limiting exemplary illustration, current data 218 is compared to a reference data 220 and using conventional mathematical analysis program 246, such as statistical analysis, a prediction analysis can be made or calculated as to the likelihood that the industrial component 102 (or component element 112) being evaluated will have an error or a failure within a defined time segment. Further, in a preferred embodiment of the invention, the analyzer 122 operates in conjunction with the master controller 106 to modify the operation of the industrial system 100, such as by slowing down or speeding up the operation of the various industrial components 102 or to activate or deactivate various industrial components 102 thereby allowing an operator to perform maintenance or repairs to one or more industrial components (or component elements) that are predicted to fail. Thus, in a preferred embodiment the analyzer operates to make a comparison of reference data for one or more industrial components that have sustained an error or malfunction with data copied by said performer for said at least one industrial component prior to having an error or malfunction and using conventional mathematical analysis operates to make recommendations with regard to said at least one industrial component based on said comparison and transmits the recommendations (such as modify the industrial system) to allow correction or to correct or allow corrections to be made to one or more of the industrial components It should also now be apparent that the system and method for monitoring and analyzing industrial operations of the subject invention provides a structured methodology and design that is new and novel but is not limited to the specific design of the system. Although the foregoing invention has been described in some detail for purposes of clarity of understandings, it will be apparent that certain changes and modifications may be practiced within the scope of the appended claims. Accordingly, it should also now be apparent that the various embodiments presented can be easily modified while keeping within the scope and spirit of the subject invention. It should also be understood that the present disclosure is to be considered as exemplary of the principals of the invention and is not intended to limit the invention to the embodiments and the specific examples illustrated and the invention is not to be limited to the details given herein, but may be modified within the scope and equivalents of the descriptions and examples contained herein.

The invention claimed is:

1. A system comprising:
    a component that operates to collect data;
    a communication network that operates to transmit said collected data through a data stream to a performer;
    wherein said performer operates to copy at least a portion of said collected data being transmitted through said data stream without impeding said data stream; and
    an analyzer that operates to analyze said copy of said at least a portion of said collected data by comparing said at least a portion of said collected data to reference data.

2. The system of claim 1 wherein the system further includes a databank having a query-able data base for storing said copy of said at least a portion of said collected data.

3. The system of claim 1 wherein the system further comprises one or more industrial components having one or more sensors that operate to collect said collected data.

4. The system of claim 1 wherein said collected data is in the form of data blocks.

5. The system of claim 1 wherein said analyzer performs a predictive analysis of said copy of said at least a portion of said collected data.

6. The system of claim 5 wherein said prediction analysis uses historical data to predict an error or malfunction occurring prior to said error or malfunction.

7. A system for analyzing data comprising:
    a system that operates to receive data;
    a communication network that operates to transmit said received data through a data stream to a performer;
    wherein said performer operates to collect at least a portion of said received data being transmitted through said data stream without impeding said data stream; and
    an analyzer that operates to analyze said at least a portion of said collected data by comparing said at least a portion of said collected data to reference data.

8. The system of claim 7 wherein the system for analyzing data further includes a databank having a query-able data base for storing said copy of said at least a portion of said collected data.

9. The system for analyzing data of claim 7 further comprises one or more industrial components having one or more sensors that operate to collect said collected data.

10. The system for analyzing data of claim 7 wherein said collected data is in the form of data blocks.

11. The system for analyzing data of claim 7 wherein said analyzer performs a predictive analysis of said copy of said at least a portion of said collected data.

12. A process for analyzing data comprising the steps of:
using a component that operates to collect data;
using a communication network that operates to transmit the collected data through a data stream to a performer;
wherein the performer operates to copy at least a portion of the collected data being transmitted through the data stream without impeding the data stream; and
using an analyzer that operates to analyze the copy of the at least a portion of the collected data by comparing the at least a portion of the collected data to reference data.

* * * * *